United States Patent
Suryanarayanan (10) Patent No.: US 12,330,534 B1
(45) Date of Patent: Jun. 17, 2025

(54) SUPPLEMENTING REGENERATIVE BRAKING

(71) Applicant: Rivian IP Holdings, LLC, Irvine, CA (US)

(72) Inventor: Vivek Narsimhan Suryanarayanan, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/389,702

(22) Filed: Dec. 19, 2023

(51) Int. Cl.
    *B60L 7/26*      (2006.01)

(52) U.S. Cl.
    CPC ............ *B60L 7/26* (2013.01); *B60L 2240/429* (2013.01); *B60L 2240/545* (2013.01); *B60L 2240/549* (2013.01); *B60L 2250/26* (2013.01)

(58) Field of Classification Search
None
See application file for complete search history.

(56) References Cited

U.S. PATENT DOCUMENTS

| | | | | |
|---|---|---|---|---|
| 10,099,557 | B2 * | 10/2018 | Matsubara | .............. B60L 58/40 |
| 2013/0289809 | A1 * | 10/2013 | Treharne | ............... B60L 3/0046 |
| | | | | 180/65.285 |
| 2014/0330466 | A1 * | 11/2014 | Bureau | ................. B60W 20/40 |
| | | | | 903/903 |
| 2015/0202964 | A1 * | 7/2015 | Nefcy | ................... B60W 10/08 |
| | | | | 701/70 |
| 2016/0264002 | A1 * | 9/2016 | Suda | .................... B60T 8/17616 |
| 2016/0325637 | A1 * | 11/2016 | Payne | ..................... B60L 50/16 |
| 2018/0244157 | A1 * | 8/2018 | Hirakawa | ................. B60L 7/10 |

\* cited by examiner

*Primary Examiner* — Navid Z. Mehdizadeh
*Assistant Examiner* — Jason R Roberson
(74) *Attorney, Agent, or Firm* — Patterson + Sheridan, LLP (57) ABSTRACT

A vehicle controller performs regenerative braking using one or more drive units. The capacity of a battery of the vehicle to receive regenerative current is compared to a reference capacity and an amount of friction braking is generated based on the comparison. The capacity may be determined based on temperature and state of charge of the battery and the duration of regenerative braking. Other systems of the vehicle may select the amount of friction as part of a safety control algorithm or automated driving control algorithm.

16 Claims, 6 Drawing Sheets

SUPPLEMENTING REGENERATIVE BRAKING

INTRODUCTION

The present disclosure relates to supplementing regenerative braking in a battery electric or hybrid vehicle.

SUMMARY

The present disclosure describes an approach for providing consistent regenerative braking. In one aspect, a vehicle includes a chassis, a plurality of wheels mounted to the chassis, a battery mounted to the chassis, and one or more drive units. Each drive unit is configured to drive one or more of the plurality of wheels using drive current supplied by the battery. Each drive unit is further configured to perform regenerative braking for the one or more of the plurality of wheels to generate regenerative current supplied to the battery. The vehicle further includes a friction braking system coupled to the plurality of wheels. A controller is coupled to one or more drive units and to the friction braking system. The controller is configured to supplement the regenerative braking of the one or more drive units with friction braking by the friction braking system in response to a decrease in a currently available capacity of the battery to receive the regenerative current.

DETAILED DESCRIPTION

One of the significant advantages of an electric vehicle, such as a battery electric vehicle or hybrid vehicle, is the ability to perform regenerative braking. During regenerative braking, a motor operates as a generator, converting kinetic energy into electrical energy that is stored in the vehicle's battery. The vehicle will still include friction brakes (e.g., hydraulic disc brakes) to provide additional stopping power when needed. In some modes of operation, regenerative braking will be used almost exclusively for most driving conditions.

The amount of regenerative braking available depends on the capacity of the battery to receive regenerative current from the motor. This capacity to receive regenerative current decreases with increasing state of charge (SOC) of the battery, increasing temperature of the battery, and increasing duration of a regenerative braking event. Accordingly, the amount of braking actually provided at a given vehicle speed and pedal position (brake and/or accelerator pedal) may vary. Such variations in braking may result in an inconsistent driving experience.

Using the approach described herein, friction braking is automatically applied to compensate for reductions in regenerative braking capacity. In various embodiments, control of friction braking may be superseded by some other control algorithm or module, such as a traction control system (TCS), stability control system, automatic emergency braking (AEB), anti-lock braking system (ABS), adaptive cruise control (ACC) automatic driving assistance system (ADAS), or other control system or algorithm.

Figure 1A:
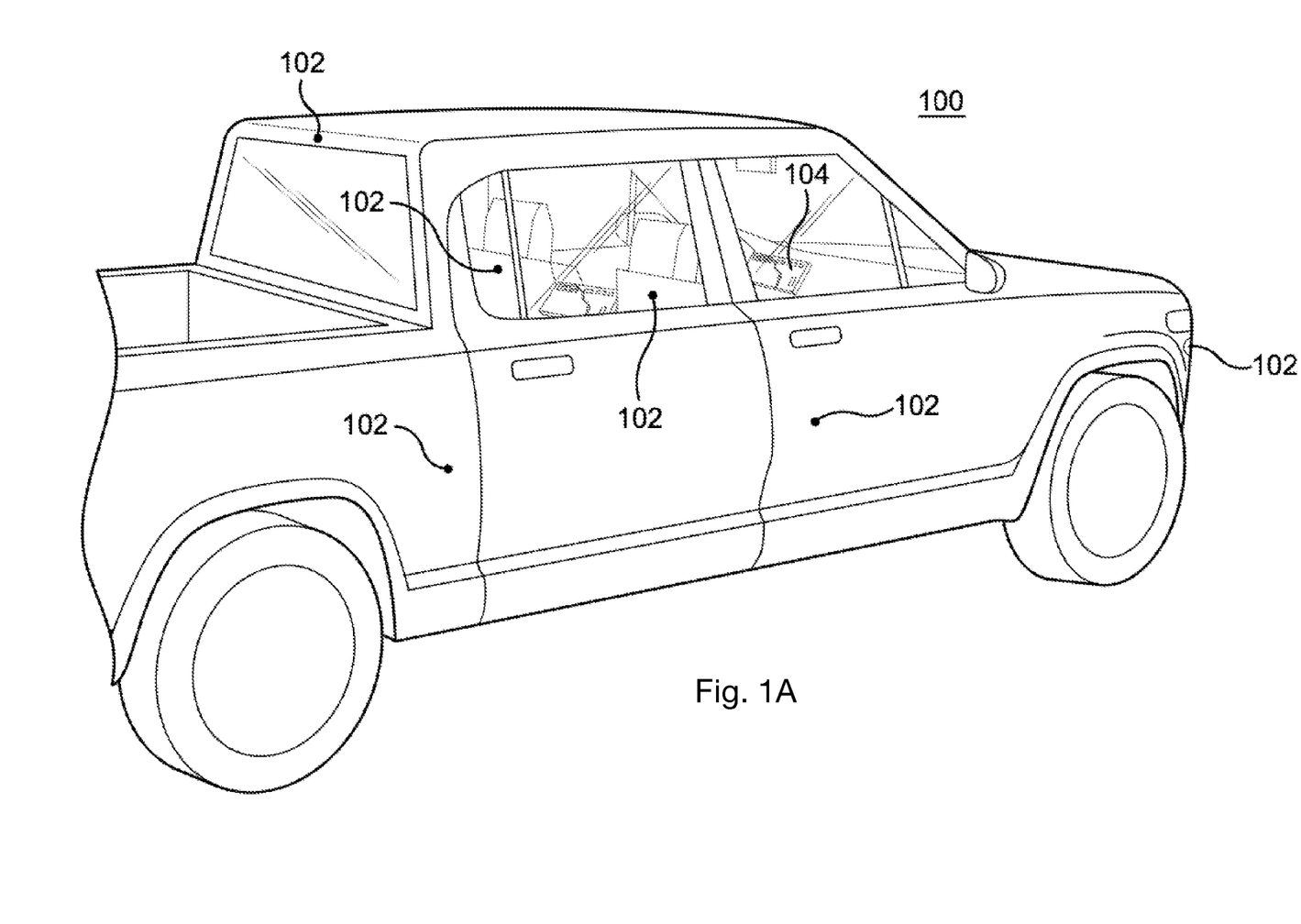
FIG. 1A illustrates an example vehicle having that may be operated in accordance with certain embodiments.

FIG. 1A illustrates an example vehicle 100. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver.

Figure 1B:
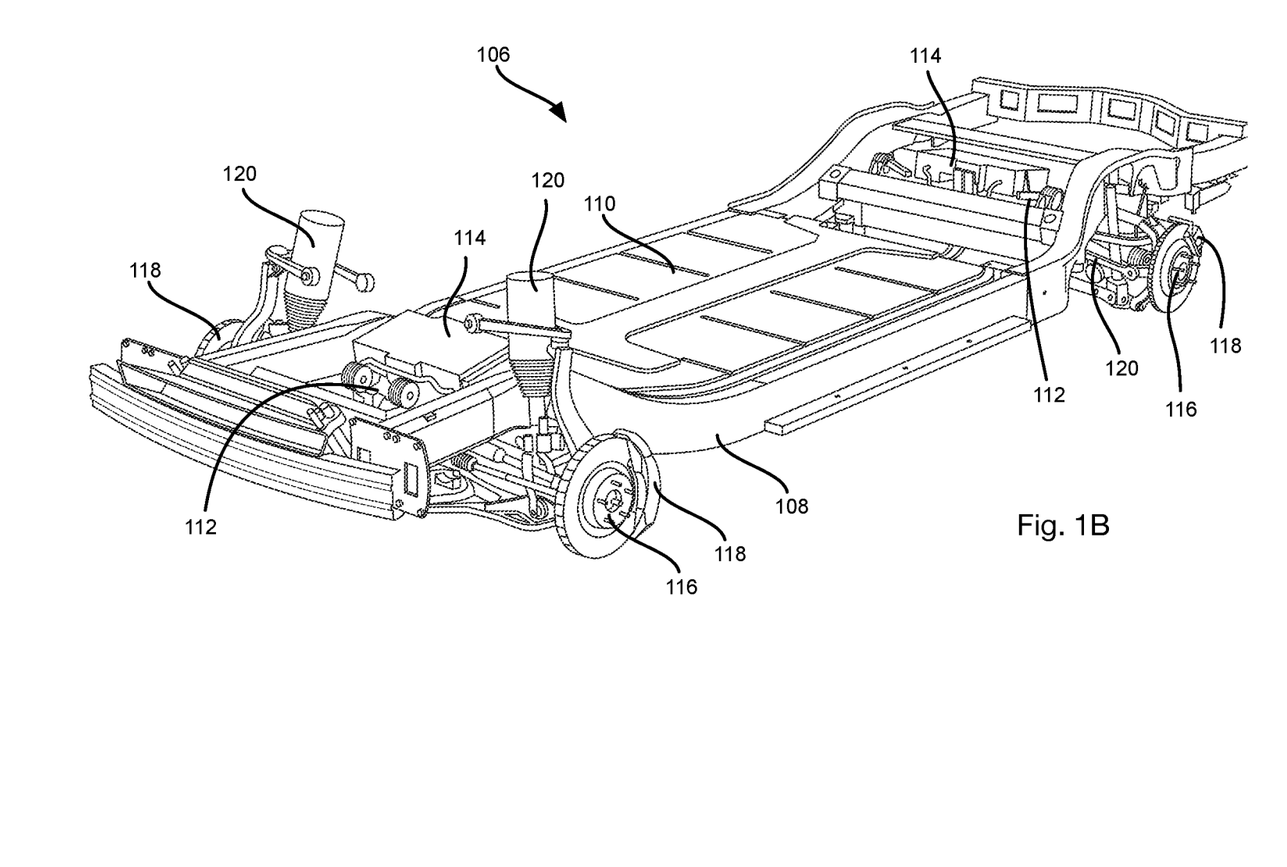
FIG. 1B illustrates a chassis of a vehicle having multiple drive units that may be operated in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle (i.e., unibody construction).

In embodiments where the vehicle 100 is a battery electric vehicle (BEV) or possibly a hybrid vehicle, a large battery 110 is mounted to the chassis 106 and may occupy a substantial (e.g., at least 80 percent) of an area within the frame 108. For example, the battery 110 may store from 100 to 200 kilowatt hours (kWh). The battery 110 may be a lithium-ion battery or other type of rechargeable battery. The battery may be substantially planar in shape.

Power from the battery 110 may be supplied to one or more drive units 112. Each drive unit 112 may be formed of an electric motor and possibly a gear train providing a gear reduction. In some embodiments, there is a single drive unit 112 driving either the front wheels or the rear wheels of the vehicle 100. In another embodiment, there are two drive units 112, each driving either the front wheels or the rear wheels of the vehicle 100. In yet another embodiment, there are four drive units 112, each drive unit 112 driving one of four wheels of the vehicle 100.

Power from the battery 110 may be supplied to the drive units 112 by power electronics 114 of each drive unit 112. The power electronics 114 may include inverters configured to convert direct current (DC) from the battery 110 into alternating current (AC) supplied to the motors of the drive units 112. The power electronics 114 further facilitate operation of the motors of the drive units as generators to provide regenerative braking. The power electronics 114 further facilitate the transfer of regenerative current to the battery 110.

The drive units 112 are coupled to two or more hubs 116 to which wheels may mount. Each hub 116 includes a corresponding brake 118, such as the illustrated disc brakes. Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIG. 1B and in the discussion below, the vehicle 100 is a battery electric vehicle. However, the systems and methods disclosed herein may be used for any type of vehicle, including vehicles powered by an internal combustion engine (ICE), hybrid drivetrain, hydrogen fuel cell drivetrain, or other type of drivetrain that may have a portion that is idled during some modes of operation. For example, a front or rear differential of an all-wheel drive vehicle. In another example, in a hybrid drive train, an idled drive unit including an electric motor may be heated with waste heat from an ICE according to the approaches described herein.

Figure 2:
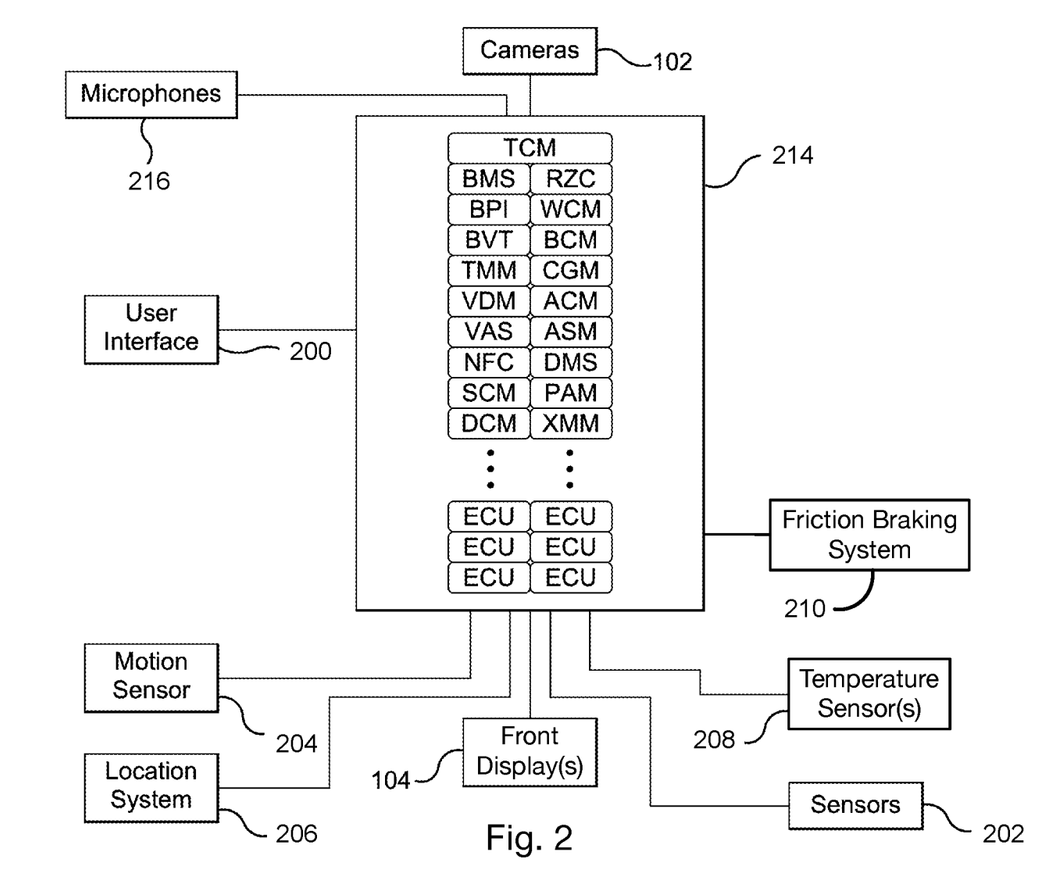
FIG. 2 is a schematic block diagram of components for operating the vehicle in accordance with certain embodiments.

FIG. 2A illustrates example components of the vehicle 100 of FIG. 1A. As seen in FIG. 2A, the vehicle 100 includes the cameras 102, the one or more front displays 104, a user interface 200, one or more sensors 202, a motion sensor 204, and a location system 206. The one or more sensors 202 may include ultrasonic sensors, radio detection and ranging (RADAR) sensors, light detection and ranging (LIDAR) sensors, or other types of sensors. The location system 206 may be implemented as a global positioning system (GPS) receiver. The user interface 200 allows a user, such as a driver or passenger in the vehicle 100, to provide input.

The components of the vehicle 100 may include one or more temperature sensors 208. The temperature sensors 208 may include sensors configured to sense an ambient air temperature, temperature of the battery 110, temperature of power electronics 114, temperature of each drive unit 112 and/or each motor of each drive unit 112, temperature of coolant fluid entering or leaving a coolant system, temperature of oil within a drive unit 112, or the temperature of any other component of the vehicle 100.

The components of the vehicle 100 may include a friction braking system 210. The friction braking system 210 may include any components of a hydraulic braking system, such as a rotor, brake pads, calipers, caliper pistons, a master cylinder coupled to the brake pedal and coupled to the caliper pistons by brake lines. The friction braking system 210 may further include a pump and/or valves for automatically applying hydraulic pressure to the caliper pistons. The friction braking system 210 may be implemented as a drum braking system or any friction braking system known in the art.

A control system 214 executes instructions to perform at least some of the actions or functions of the vehicle 100, including the functions described in relation to FIGS. 3 to 6. For example, as shown in FIG. 2A, the control system 214 may include one or more electronic control units (ECUs) configured to perform at least some of the actions or functions of the vehicle 100, including the functions described in relation to FIGS. 3 to 6. In certain embodiments, each of the ECUs is dedicated to a specific set of functions. Each ECU may be a computer system and each ECU may include functionality described below in relation to FIGS. 3 to 6.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102, sensors 202, motion sensor 204, location system 206, and temperature sensors 208. The sensor signals collected by the CGM ECU are then communicated to the appropriate ECUs for performing, for example, the operations and functions described in relation to FIGS. 3 to 6.

The control system 214 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU.

If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 216, etc.) to the TCM ECU.

The ECUs may include one or more ECUs that are configured to control the friction braking system 210. For example, the ECUs may include a traction control module, a stability control system, automated emergency braking (AEB) module, anti-lock braking system (ABS), adaptive cruise control module (ACC), and/or an automated driving assistance system (ADAS). The traction control module controls braking and acceleration to control wheel slip according to any approach known in the art. The traction control module may also control the torque applied at each wheel, i.e., torque vectoring. The stability control system controls braking and acceleration in order to avoid rollovers of the vehicle 100 according to any approach known in the art. The AEB module stops the vehicle 100 in a controlled manner response to predicted collisions according to any approach known in the art. The ABS modulates braking to maintain traction. The ACC maintains a speed of the vehicle while also maintaining a prescribed following distance with respect to other vehicles. The ADAS controls steering, acceleration, and braking of the vehicle 100 to arrive at a destination according to any self-driving approach known in the art.

Figure 3:
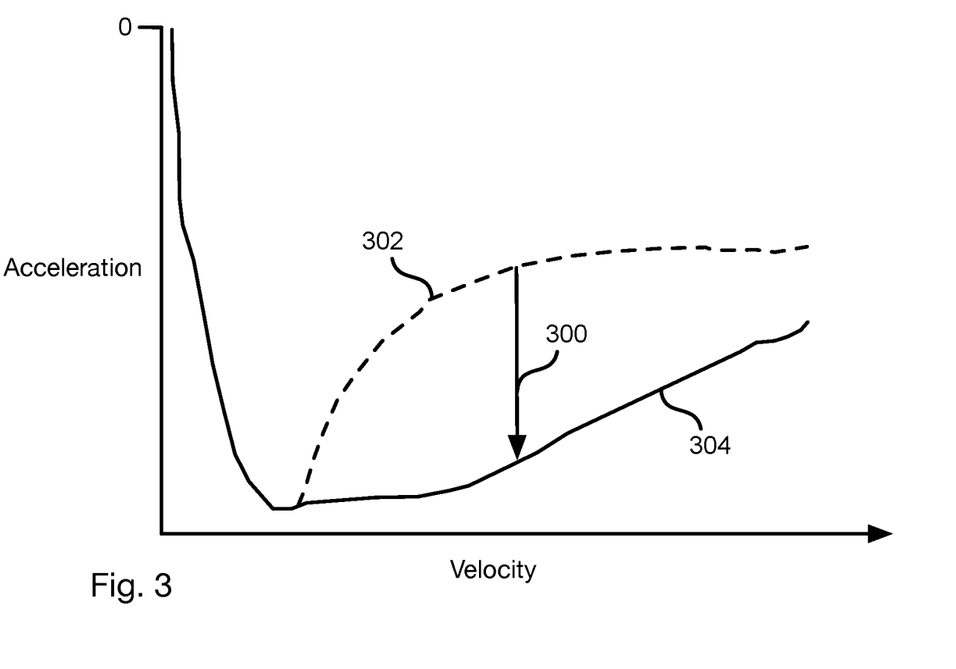
FIG. 3 is a plot showing variation in performance of regenerative braking.

Referring to FIG. 3, the deceleration 302 achievable using regenerative braking of the one or more drive units 112 and battery 110 may vary with respect to vehicle velocity, as shown. As is also apparent, when the battery 110 is at a full state of charge (SOC), the amount of deceleration achievable using regenerative braking is reduced substantially relative to full regenerative braking 304. As used herein, "full regenerative braking" refers to regenerative braking under experimentally determined ideal conditions providing maximum regenerative braking for a given vehicle speed.

The experimentally determined ideal conditions may provide the maximum regenerative braking performance as measured in a design of experiment (DOE) space with respect to variables including at least battery temperature, battery SOC, and duration of regenerative braking. The experimentally determined ideal conditions may be determined with temperature tested at increments of less than 2 degrees Celsius, 1 degree Celsius, or 0.5 degrees Celsius, SOC tested in increments of less than 10 kWh, 5 kWh, or 1 kWh, and duration of regenerative braking measured in increments of less than 10 min, 5 min, or 1 min. The experimentally determined ideal conditions may be performed with a time lapse of at least 5, 10, or 20 minutes since a previous episode of regenerative braking. It is to be understood that the "ideal conditions" are determined experimentally with the level of precision as outlined above and need not in fact be those that achieve actual maximum possible regenerative braking performance.

An amount 300 of deceleration may be imposed according to the approach described herein using the friction braking system 210 in order to achieve a total deceleration that is substantially equal to the full regenerative braking 304 for a given vehicle speed, e.g., within 10 percent, 5 percent, or 1 percent of the amount of full regenerative braking 304 for a given vehicle speed. The amount of current generated at decelerating at full regenerative braking 304 may be used as a reference capacity against which the current capacity of the battery 110 to receive regenerative current may be compared according to the methods described herein.

Figure 4:
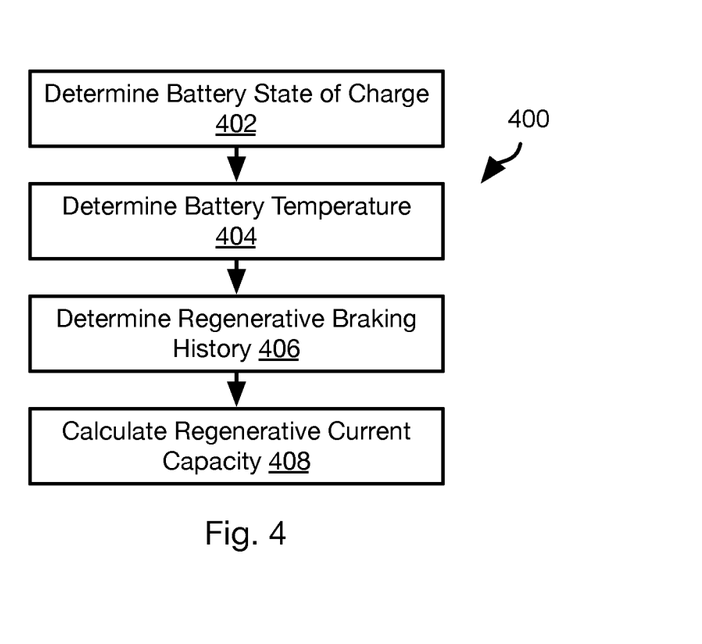
FIG. 4 is a process flow diagram of a method for determining regenerative braking capacity in accordance with certain embodiments.

FIG. 4 illustrates a method 400 for determining the capacity of the battery 110 to receive regenerative current from the one or more drive units 112. The method includes determining, at step 402, the state of charge of the battery 110 and determining, at step 404, the temperature of the battery 110. The state of charge and temperature may be reported by the BMS or other component of the vehicle 100. The method 400 includes determining, at step 406, a regenerative braking history. Step 406 may include evaluating an amount of regenerative current generated in a preceding time window, e.g., a number of amps generated within a preceding time window, a weighted sum of the numbers of amps for multiple preceding time windows, or other function of previously generated regenerative current.

The method 400 may then include calculating, at step 408, a currently available capacity of the battery 110 to receive regenerative current based on the state of charge from step 402, the battery temperature from step 404, and the regenerative braking history from step 406. Step 408 may include using an experimentally determined curve fit obtained from measurements of regenerative current capacity for various battery states of charge, battery temperatures, and regenerative braking histories or by performing interpolation between such measurements.

In general, the capacity of the battery 110 to receive regenerative current will decrease with an increase in temperature of the battery 110 above a temperature threshold, an increase in state of charge, and an increase of a duration of regenerative braking, as compared to the temperature, state of charge, and duration of regenerative braking defining ideal conditions at which the reference capacity was measured. Below the temperature threshold, the capacity of the battery 110 to receive regenerative current increases with increase in temperature of the battery 110.

Figure 5:
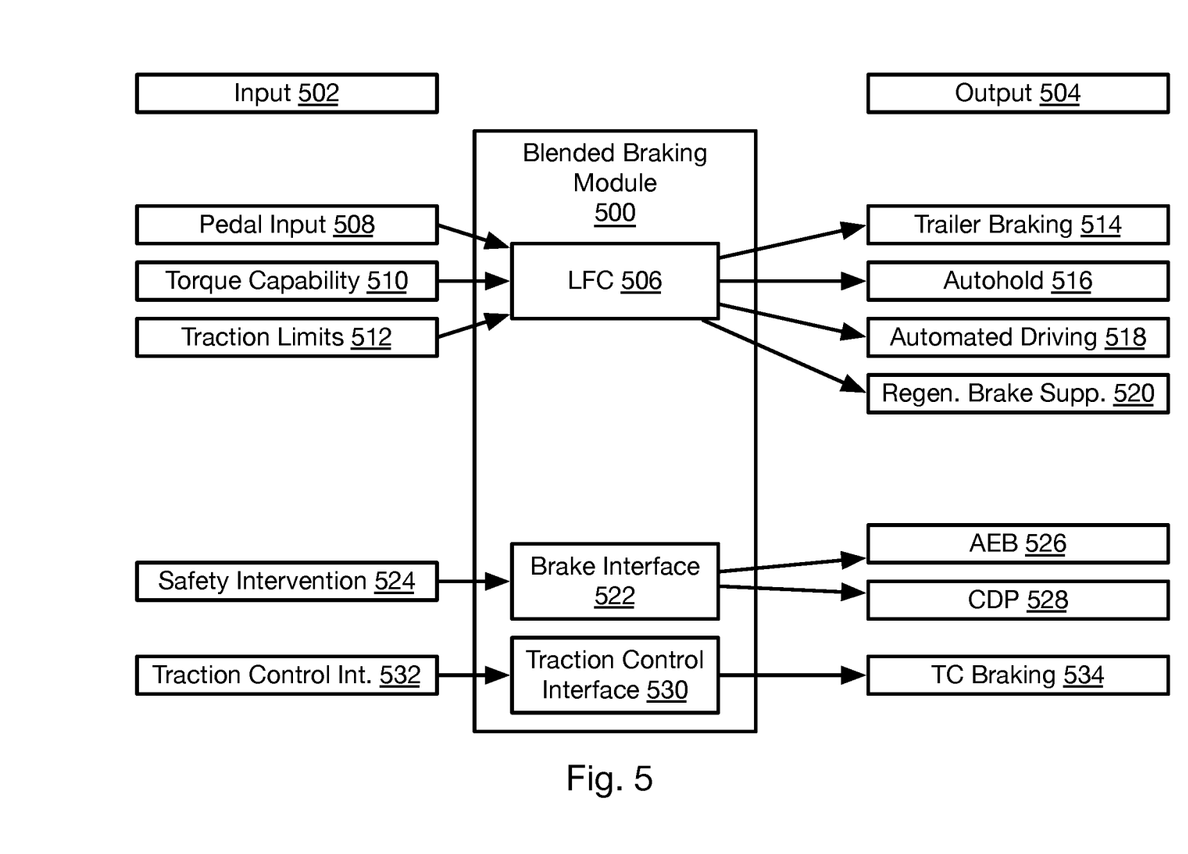
FIG. 5 is a schematic block diagram illustrating a blended braking module in accordance with certain embodiments.

FIG. 5 illustrates a blended braking module 500 that may be implemented by the control system 214 or be a component coupled to the control system 214. The blended braking module 500 receives various inputs 502 and produces an output 504, i.e., a specified amount of friction braking. The specified amount of friction braking may be a pressure to be applied to caliper pistons, a deceleration, or other measure of an amount of friction braking.

The blended braking module 500 may include a longitudinal force control (LFC) module 506. The LFC module 506 determines an amount of longitudinal force (forward or reverse) based on driver control inputs and other values defining dynamics of the vehicle 100. The LFC module 506 may also determine an amount of longitudinal force for automated driving functions that are not related to emergency stopping, traction control, or stability control, such as those implemented by the DCC module and/or ADAS.

The inputs 502 received by the LFC module 506 may include a pedal input 508, e.g., a position, change in position, or rate of change in position of a brake pedal. In some embodiments, the pedal input 508 may include the position, change in position, or rate of change in position of an accelerator pedal. For example, where the vehicle 100 has "one pedal driving" enabled, releasing of the accelerator pedal from a depressed position may be interpreted as a braking input and invoke regenerative braking according to the approach described herein. The LFC module 506 may increase an amount of current supplied to the drive units 112 in response to depression of the accelerator pedal.

Other inputs 502 to the blended braking module 500 may include a torque capability 510 and traction limits 512. The torque capability may include limits for torque that may be output by the one or more drive units 112. The traction limits 512 may be predefined or measured limits on the traction of the wheels of the vehicle 100 that limits how much longitudinal acceleration or deceleration is permitted.

The LFC module 506 processes the inputs 502 to produce the output 504. The output 504 may be a control input to the friction braking system 210. The output 504 may be achieve one or more results with respect to the vehicle 100. For example, the output 504 may invoke trailer braking 514, e.g., braking that one or both of (a) takes into account the weight of an attached trailer and (b) activates brakes of the attached trailer. The output 504 may invoke autohold 516, in which the brakes hold the vehicle 100 in place without requiring the driver to press the brake pedal until the driver presses the accelerator pedal. The output 504 may control braking to traverse a route automatically and perform obstacle avoidance as part of automated driving 518, e.g., ACC or ADAS.

The output 504 of the LFC module 506 may also be a control input to the friction braking system 210 implementing regenerative braking supplementation 520. As noted above with respect to FIG. 3, friction braking may be used to approximate full regenerative braking 304. A method by which regenerative braking supplementation 520 is performed is described below with respect to FIG. 6.

The blended braking module 500 may further implement a brake interface 522 receiving an input 502 implementing a safety intervention 524. The safety intervention 524 may be generated by an obstacle detection system that detects possible collisions based on obstacles detected in images from the one or more cameras 102 or other sensors, such as ultrasonic sensors, radio detection and ranging (RADAR) sensors, light detection and ranging (LIDAR), or other types of sensors. For example, the safety intervention 524 may be the output of an AEB module, anti-lock braking system (ABS), or other safety system. The blended braking module 500 may product an output 504 in response to the safety intervention 524, such as a control input to the friction braking system 210 invoking automatic emergency braking 526, a continuous deceleration profile 528, or other control input.

The blended braking module 500 may further implement a traction control interface 510 that takes as an input 502, a traction control intervention 532, such as from a traction control module. The traction control intervention 532 may be generated by the traction control module in response to detected wheel slip. The traction control intervention 532 may command a reduction in torque from one or more of the drive units 112 and may further invoke the generation of a traction control braking command 534, which is an input to the friction braking system 210 that causes braking of one or more wheels. For example, in some embodiments, a first wheel may be braked to reduce slip of the first wheel and further cause the transfer of more torque to a second wheel that is coupled to the first wheel by a differential.

Figure 6:
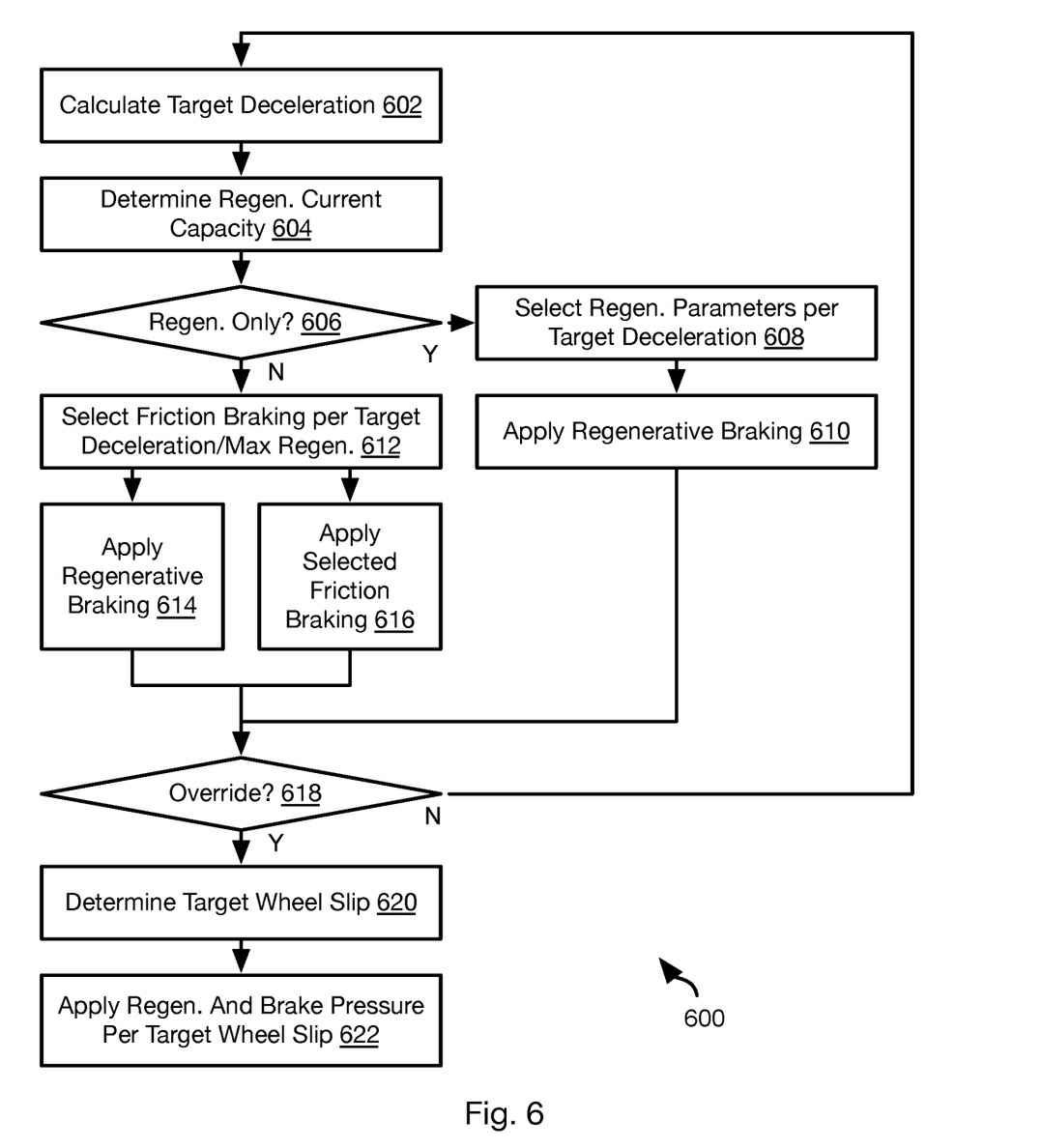
FIG. 6 is a process flow diagram of a method for performing blended braking in accordance with certain embodiments.

As is apparent in FIG. 5, the blended braking module 500 incorporates the LFC module 506, brake interface 522, and traction control interface 530. The blended braking module 500 may therefore coordinate which module or interface is used to control the friction braking system 210. FIG. 6 further illustrates how such coordination may be performed.

FIG. 6 illustrates a method 600 that may be performed by the blended braking module 500. The method 600 may include calculating, at step 602, a target deceleration. The target deceleration may be determined according to any of the inputs 502 and may therefore be either driver selected based on the pedal input 508 or automatically selected according to an ACC or ADAS control algorithm.

The method 600 may include determining, at step 604, currently available capacity of the battery 110 to receive regenerative current. Step 604 may include executing the method 400. The method 600 may include evaluating, at step 606, whether an available deceleration that can be provided via regenerative braking (based on the currently available capacity of the battery 110 to receive regenerative current) is greater than or equal to the target deceleration determined at step 602. If yes, then parameters defining regenerative braking are selected, at step 608, in order to achieve the target deceleration. The parameters may be calculated according to any approach known in the art for performing regenerative braking. Regenerative braking is then applied, at step 610, according to the parameters of step 608.

If the result of the evaluation of step 606 is negative, then the method 600 may include selecting, at step 612, an amount of friction braking that will be applied to supplement the regenerative braking. For example, the amount of friction braking selected at step 612 may correspond to the amount 300 of friction braking needed to supplement the currently available regenerative braking and achieve the full regenerative braking 304. Stated differently, the amount of friction braking may correspond to a difference between the currently available capacity of the battery 110 to receive regenerative current and the reference capacity corresponding to the full regenerative braking 304. The method 600 may then include applying, at step 614, regenerative braking and simultaneously applying, at step 616, the amount of friction braking selected at step 612 such that the combination of friction and regenerative braking is substantially equal to (e.g., within +/−5 percent of) the target deceleration. The amount of regenerative braking may be selected to substantially achieve (e.g., within 90 percent of) the currently available capacity of the battery to receive regenerative current as determined at step 604. Steps 602-616 may be performed repeatedly, e.g., as a feedback loop. Feedback may be used to control the friction and/or regenerative braking in order to adjust the achieved deceleration to be closer to the target deceleration and/or to adjust the target acceleration. Feedback may account for variation, such as variation in the state of charge of the battery 110, variation in battery and/or ambient temperature, variation in the performance of the friction braking system 210, variation in the target deceleration due to driver maneuvers, or other factors.

As shown in FIG. 6, the feedback loop may be interrupted in response to determining, at step 618, that the friction braking selection at step 612 should be overridden. As used herein, "overridden" may include exiting a first mode in which friction braking and regenerative braking are selected as described with respect to steps 602-616. "Overridden" may also be understood as exiting a first mode in which the amount of friction braking is selected such that combined friction and available regenerative braking approximate the full regenerative braking 304 as described above with respect to FIG. 3. Upon exiting the first mode, the amount of friction braking may be selected without regard to a difference between available regenerative braking and full regenerative braking 304. The amount of friction braking instead may be selected based on wheel slip, to avoid an obstacle, to achieve a desired rate of deceleration, or for other reasons.

For example, the method 600 may include determining, at step 620, a target amount of wheel slip for a wheel of the vehicle 100 and applying, at step 622, an amount of friction braking to the wheel in order to achieve the target wheel slip. The target amount of wheel slip may be determined according to a traction control algorithm using any approach known in the art. In other examples, the amount of friction braking may be selected to avoid an obstacle according to the AEB module or to achieve a desired rate of deceleration according to the ABS. The amount of friction braking may be selected to reduce likelihood of vehicle rollover by the stability control system. The method 600 may further include selecting the amount of friction braking based on a friction braking history, e.g., to account for brake fade due to heating of brake rotors.

The method 600 may be repeated periodically, such as starting from step 602 or other step of the method 600. Whether the method 600 is executed may be controlled by a user. For example, the control system 214 may present an interface for receiving an input enabling or disabling performance of the method 600. Where the method 600 is not enabled, any one-pedal driving based on the position of the accelerator pedal will perform only regenerative braking and friction braking will be performed only when the driver presses the brake pedal or when friction braking is invoked by some other control algorithm (e.g., traction control module, stability control module, AEB, ABS, ACC, or ADAS). Such an interface may provide other information, such as an indicator of the state of the friction braking system 210, such as whether the friction brakes have been derated due to excessive heating.

Where the friction braking system 210 is a hydraulic braking system, pressure may be automatically increased at the calipers of the brakes 118 of one or more wheels. In some cases, the pressure at the calipers may be greater than a pressure at a master cylinder that is acted upon by the brake pedal. As a result, there may be a decrease in a degree of resistance felt by the driver and/or an increase in an amount of travel before the amount of friction braking increases in response to depression of the brake pedal. This behavior may be handled in various ways. In a first approach, pressure at the calipers of one or more wheels is increased in response to detected depression of the pedal without regard to pressure at the master cylinder in instances where the pressure at the master cylinder is lower than the pressure at the calipers of the one or more wheels. In a second approach, pressurized hydraulic fluid is provided to a reservoir of the master cylinder to match the pressure at the calipers. In a third approach, a mechanical or electronic actuator is used to increase resistance to pedal movement to simulate resistance imposed by the master cylinder as if at the same pressure as is present at the calipers. The first, second, and third approaches may be used alone or in combination.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:
1. A vehicle comprising:
a chassis;
a plurality of wheels mounted to the chassis;
a battery mounted to the chassis;
one or more drive units, each drive unit configured to:
  drive one or more of the plurality of wheels using drive current supplied by the battery; and
  perform regenerative braking for the one or more of the plurality of wheels to generate regenerative current supplied to the battery;
a friction braking system coupled to the plurality of wheels; and
a controller coupled to one or more drive units and to the friction braking system, the controller configured to:
  operating in a first mode by performing the regenerative braking with the one or more drive units while supplementing the regenerative braking with friction braking by the friction braking system in response to a decrease in a currently available capacity of the battery to receive the regenerative current such that a combination of an amount of the friction braking and the regenerative braking is substantially equal to regenerative braking when the battery is at a reference capacity; and
  in response to detecting slip of a wheel included in the plurality of wheels:
  overriding the first mode by controlling braking of the friction braking system without regard to a difference between the currently available capacity of the battery to receive the regenerative current and the reference capacity of the battery to receive the regenerative current;
  determining a target amount of wheel slip for the wheel; and performing the friction braking to achieve the target amount of wheel slip.

2. The vehicle of claim 1, wherein the amount of friction braking decreases with increasing speed of the vehicle.

3. The vehicle of claim 1, wherein the controller is further configured to:
in response to detecting the slip of the wheel of the plurality of wheels, control braking of the friction braking system according to the slip without regard to a difference between the currently available capacity of the battery to receive the regenerative current and the reference capacity of the battery to receive the regenerative current.

4. The vehicle of claim 1, wherein:
the currently available capacity of the battery to receive the regenerative current corresponds to a first battery temperature and a first state of charge of the battery, and the reference capacity of the battery to receive the regenerative current corresponds to a second battery temperature and a second state of charge of the battery; and
at least one of (a) the first state of charge is different from the second state of charge, or (b) the first battery temperature is different from the second battery temperature.

5. The vehicle of claim 4, wherein the first state of charge is greater than the second state of charge.

6. The vehicle of claim 4, wherein the first battery temperature is lower than the second battery temperature.

7. The vehicle of claim 4, wherein the currently available capacity of the battery to receive the regenerative current further corresponds to a first duration of regenerative braking of the vehicle, the reference capacity of the battery to receive the regenerative current corresponding to a second duration of regenerative braking that is shorter than the first duration.

8. The vehicle of claim 1, further comprising:
a brake pedal, the friction braking system configured to increase the friction braking in response to depression of the brake pedal; and
an accelerator pedal coupled to the controller;
wherein the controller is further configured to:
increase the drive current supplied to the one or more drive units in response to depression of the accelerator pedal;
increase the regenerative braking using the one or more drive units in response to releasing of the accelerator pedal; and
supplement the regenerative braking of the one or more drive units with the friction braking by the friction braking system in absence of depression of the brake pedal in the first mode, the amount of the friction braking being based on both of (a) a difference between the currently available capacity of the battery to receive the regenerative current and the reference capacity of the battery to receive the regenerative current and (b) movement of the accelerator pedal.

9. The vehicle of claim 1, wherein the friction braking system is a hydraulic braking system.

10. The vehicle of claim 1, wherein determining the target amount of wheel slip for the wheel is based on at least one of:
an amount of wheel slip determined according to a traction control algorithm;
an amount of friction braking to avoid an obstacle;
an amount of friction braking to reduce a likelihood of rollover of the vehicle; and
an amount of friction braking to account for brake fade of the friction braking system.

11. A method comprising:
calculating, by a control system of an electric vehicle, a currently available capacity of a battery of a vehicle to receive regenerative current from one or more drive units of the electric vehicle;
determining, by the control system, a difference between the currently available capacity and a reference capacity of the battery of the vehicle to receive regenerative current;
operating in a first mode by simultaneously invoking, by the control system, regenerative braking by the one or more drive units and friction braking by a friction braking system, an amount of the friction braking supplementing the regenerative braking and corresponding to the difference between the currently available capacity and the reference capacity such that a combination of an amount of the friction braking and the regenerative braking is substantially equal to regenerative braking when the battery is at the reference capacity; and
in response to detecting slip of a wheel of the vehicle:
overriding the first mode by controlling, by the control system, braking of the friction braking system without regard to a difference between the currently available capacity of the battery to receive the regenerative current and the reference capacity of the battery to receive the regenerative current;
determining a target amount of wheel slip for the wheel; and
performing the friction braking to achieve the target amount of wheel slip.

12. The method of claim 11, wherein calculating the currently available capacity comprises calculating the currently available capacity according to a first battery temperature and a first state of charge of the battery, the reference capacity corresponds to a second state of charge of the battery and a second battery temperature, at least one of (a) the first state of charge being different from the second state of charge, or (b) the first battery temperature being different from the second battery temperature.

13. The method of claim 12, wherein the first state of charge is greater than the second state of charge.

14. The method of claim 12, wherein the first battery temperature is lower than the second battery temperature.

15. The method of claim 12, wherein calculating the currently available capacity comprises calculating the currently available capacity of the battery according to a first duration of the regenerative braking of the vehicle, the reference capacity of the battery to receive the regenerative current corresponding to a second duration of the regenerative braking that is shorter than the first duration.

16. The method of claim 11, further comprising:
increasing, by the control system, drive current supplied to the one or more drive units in response to depression of an accelerator pedal; and
increasing, by the control system, both of (a) the regenerative braking using the one or more drive units and (b) the amount of friction braking in response to releasing of the accelerator pedal.

* * * * *